Patented Nov. 11, 1947

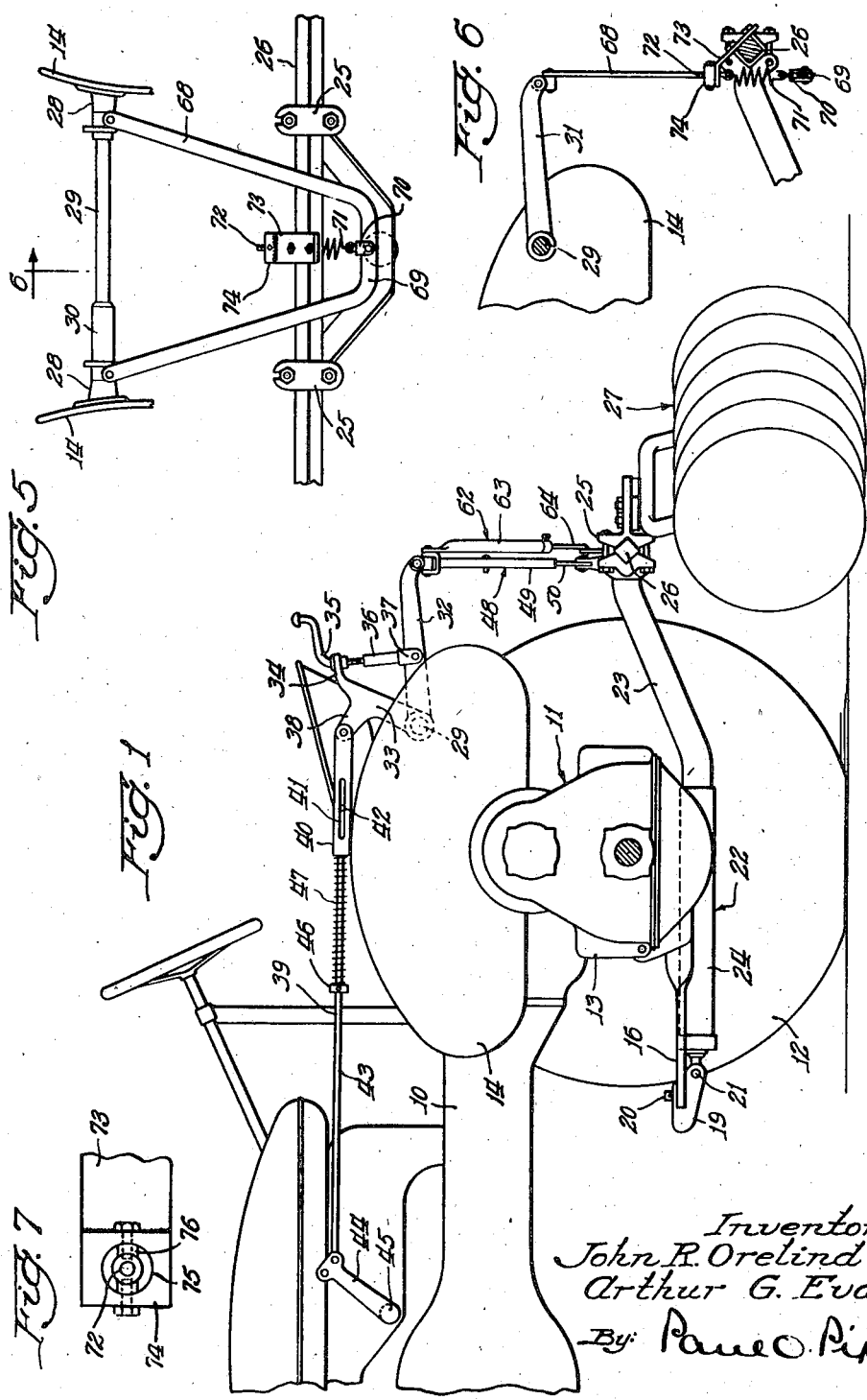

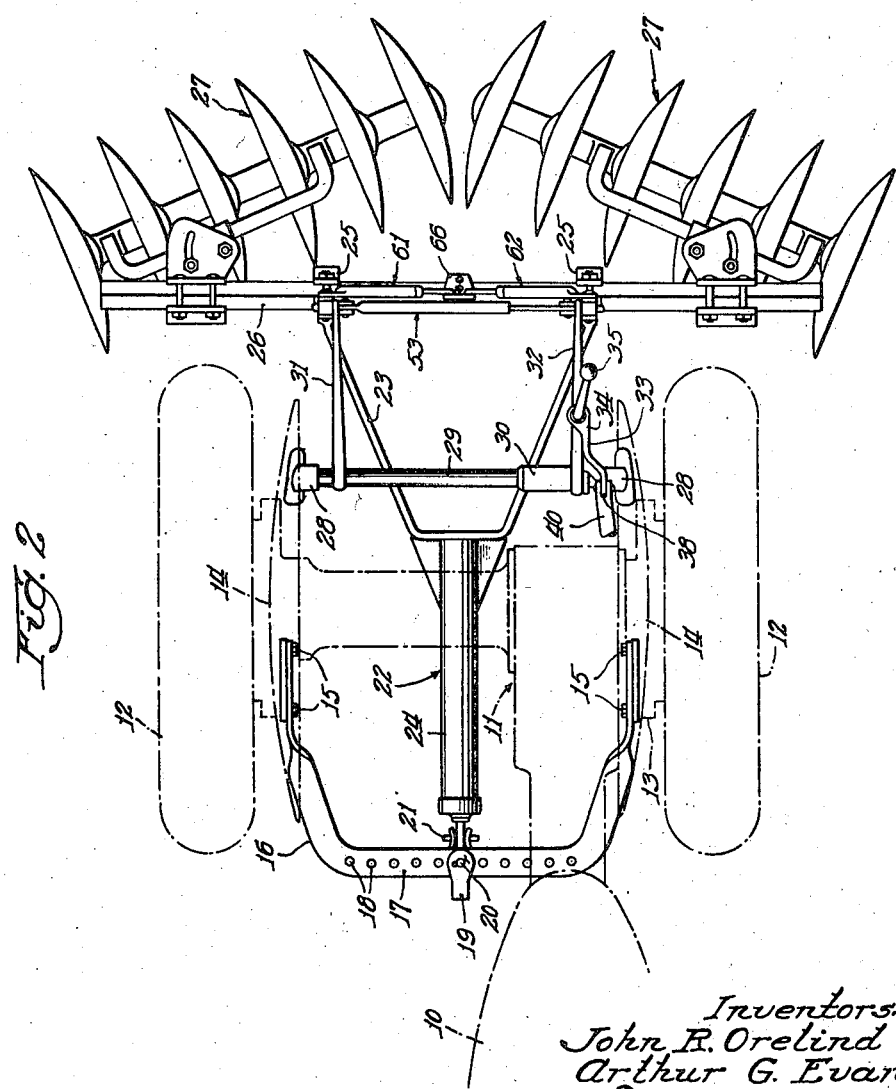

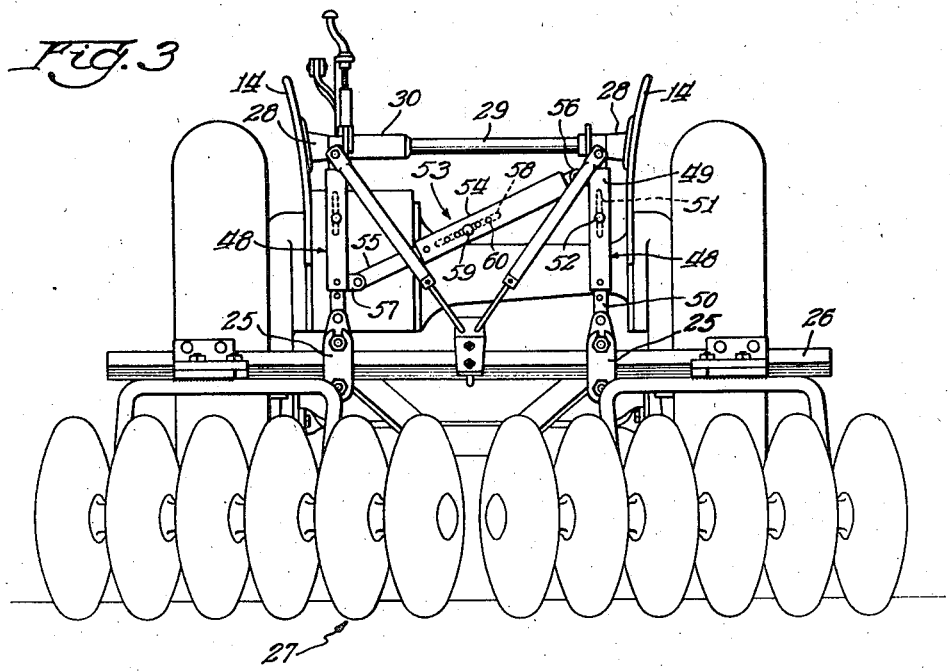
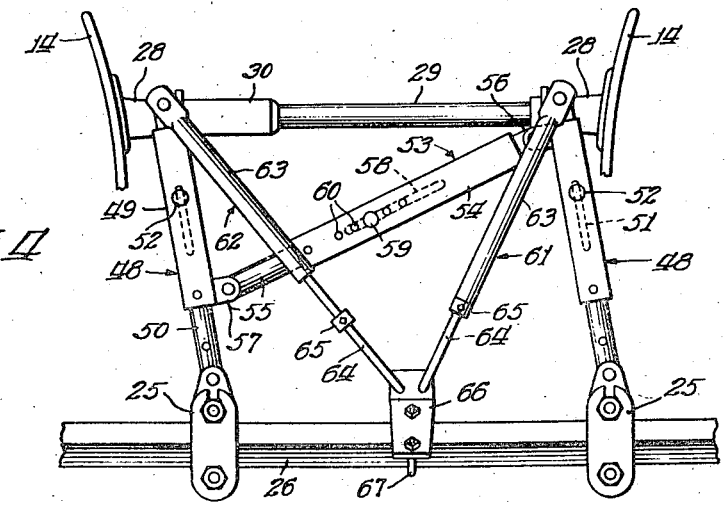

2,430,732

UNITED STATES PATENT OFFICE 2,430,732

IMPLEMENT MOUNT FOR TRACTORS

John R. Orel'nd, Wilmette, and Arthur G. Evans, Canton, Ill., assignors to International Harvester Company, a corporation of New Jersey Application September 11, 1944, Serial No. 553,548

21 Claims. (Cl. 97—47)

This invention relates to agricultural implements and particularly to tractor-mounted implements adapted to be raised from the ground for transport purposes or the like. More specifically, the invention relates to a novel frame structure for the attachment of implements to a tractor.

In copending application Serial No. 514,008, filed December 13, 1943, there is described a frame structure for the attachment to a tractor of a variety of implements having different operating characteristics. The frame structure therein described provides means whereby certain implements may be held against lateral and vertical floating movement with respect to the tractor, while other implements may be permitted free lateral and vertical movement. Among implements in the latter category is the disk harrow. Such an implement should be able to float vertically in order to follow the ground contour and should also be allowed to swing laterally in order to properly follow the tractor. However, it is also desirable that the harrow should be urged resiliently into contact with the ground. The result is that when the implement has swung laterally in response to side draft thereupon due to uneven ground or in response to turning of the tractor, it is held in that position and cannot return against the downward pressure to its proper position with respect to the tractor.

The present invention is designed to solve this and other problems and has for an object the provision of means for overcoming the forces tending to deflect the implement from its normal path and to return it to its proper working position with respect to the tractor or other vehicle upon which it is mounted.

Another object is to provide in an attaching structure permitting lateral swinging movement of the implement, pressure means for urging the implement back to its normal operating position.

A further object is to provide in an implement attaching structure permitting lateral swinging of the implement, pressure means for automatically centering the implement.

Still another object is to provide in a tractor-mounted implement having lateral swinging movement with respect to the tractor, resilient means resisting such swinging movement.

Other objects and advantages will become clear from the following detailed description when read in conjunction with the accompanying drawings, wherein:

Figure 1 is a view in side elevation of the rear end of a tractor having one drive wheel removed and showing an implement embodying the features of the present invention connected thereto;

Figure 2 is a plan view of the structure shown in Figure 1;

Figure 3 is a rear elevation of the structure shown in Figures 1 and 2;

Figure 4 is an enlarged detail of the lifting mechanism illustrating the present invention and showing the position occupied by the linkage when the tool is swung laterally;

Figure 5 is a rear elevation showing a modified form of connecting structure embodying the features of the present invention;

Figure 6 is a side elevation of the structure shown in Figure 5; and

Figure 7 is a detail of the connecting mechanism shown in Figures 5 and 6.

Numeral 10 designates the longitudinally extending, laterally offset body of a tractor having a rear axle structure generally designated at 11, rear drive wheels 12, and an implement attaching structure 13. Secured to the rear axle structure 11 are laterally spaced fenders 14 which serve an additional purpose hereinafter to be disclosed.

Secured to the attaching structure 13 at opposite sides of the tractor body by bolts 15 are the rearwardly extending arms of a draw-bar 16 having a transverse portion 17 provided with openings 18.

Adjustably connected to draw-bar 16 is a clevis 19 having a pin 20 for insertion in one of the openings 18 in the draw-bar. Pivotally connected to clevis 19 by a pin 21 is the forward end of a hitch structure generally indicated at 22. Hitch 22 comprises generally a Y-shaped member having rearwardly extending, laterally diverging arms 23 and a stem portion 24 connected at its forward end to the clevis 19.

The structure of hitch 22 forms no part of the present invention, and for the details of construction thereof, reference may be had to copending application Serial No. 514,008, filed December 13, 1943.

The rear ends of arms 23 of hitch 22 are provided with laterally spaced clamps 25 for the reception of a transverse tool bar 26 supporting a reversible disk harrow 27 of conventional construction. Thus it is clear that disk harrow 27, by virtue of its connection with hitch structure 22, has vertical and lateral swinging movement with respect to the tractor.

Vertical movement of the disk harrow with respect to the tractor is effected by means of lifting mechanism now to be described. Secured to the inner faces of fenders 14 are bearing members 28 supporting for rotation the ends of a transverse shaft 29, as clearly shown in Figures 2 to 4. Shaft 29 is likewise provided with a sleeve 30 free to rotate upon the shaft. Secured to shaft 29 and sleeve 30, respectively, are rearwardly extending generally parallel rock arms 31 and 32. Likewise secured to shaft 29 is an upwardly extending bracket 33 having a rearwardly extending ear 34 apertured to receive a threaded crank 35 insertable in a sleeve 36 provided with a yoke 37 pivotally connected to arm 32. Crank 35 thus serves for effecting adjustment between bracket 33 and arm 32.

Bracket 33 is provided also with a forwardly extending arm 38 pivotally connected to the rear end of a connecting rod 39. Rod 39 comprises a sleeve member 40 pivoted at its rear upon the arm 38 and having a slot 41 therein. Slot 41 is adapted for the reception of a pin 42 projecting from the rear end of a member 43 slidably received in sleeve 40. The forward end of member 43 is pivotally secured to a rock arm 44 mounted upon a shaft 45 rocked by any suitable power means, preferably one deriving energy from the tractor power plant. Member 43 thus has limited telescoping movement in sleeve 40. Member 43 is further provided with a collar 46 keyed thereto and is surrounded by a spring 47 abutting at one end against the collar 46 and at the other end against the sleeve 40. Rocking of the arm 44 is controlled by the tractor operator in any suitable manner and serves through member 43, spring 47, and sleeve 40 to rock shaft 29 and sleeve 30 to effect vertical swinging movement of arms 31 and 32. As will be noted in Figure 1, with the working tool in normal operating position and with the rod 39 exerting pressure to hold the tool in the ground, the pin 42 occupies a position about midway of the slot 41, so that the tool has limited floating movement.

The rear ends of the arms 31 and 32 have pivotally connected thereto the upper ends of generally parallel, laterally spaced depending telescoping links 48. Each of these links includes a sleeve portion 49 and a shaft portion 50. Shaft portion 50 is provided at its upper end with a slot 51 adapted to receive a pin 52 removably seated in an opening in the sleeve 49. Shaft 50 thus has free sliding movement in sleeve 49 within the limits of the slot 51. Sleeves 49 of the links 48 are connected by a telescoping link 53 comprising a sleeve 54 and a shaft 55. Sleeve 54 is pivotally connected at its upper end to a lug 56 projecting inwardly from the upper end of right-hand sleeve 49, and shaft 55 is pivoted at its lower end upon a lug 57 projecting inwardly from the lower end of left-hand sleeve 49. Shaft 55 telescopes within sleeve 54 and, in a manner similar to links 48, is provided with a slot 58 for the reception of a pin 59 insertable in openings 60 in the sleeve 54. Thus, in addition to the telescoping movement of links 48, they have lateral swinging movement within the limits provided by the slot 58 in sleeve 55 of link 54. The lower ends of the shafts 50 are pivotally connected to the clamps 25. It may be pointed out that this link structure, as well as certain other elements already discussed, has been described in copending application Serial No. 514,008, filed December 13, 1943.

It should now be clear that the lifting mechanism above described, by pressure of connecting rod 39, acting through spring 47, arms 31 and 32, and links 48, will function if desired to urge the disk harrow 27 downwardly into contact with the ground and will likewise serve to raise the implement to transport position upon the tractor.

While an implement such as the harrow 27 should have free vertical floating movement with respect to the tractor, as well as free lateral swinging movement within certain limits, the nature of the implement requires the exercise of pressure to hold it into contact with the ground to permit it to properly perform its agricultural function. Therefore, the spring 47 on connecting rod 39 is utilized to resiliently press the tool into the ground and permit vertical movement thereof against the action of the spring. However, a disk harrow is subject to the force of side draft, particularly when the tractor is turned and when uneven ground is encountered during operation. Such force causes the tool to move sidewise with respect to the tractor and the links 48 and 53 to assume the position shown in Figure 4. With the resilient pressure exerted by the spring 47 to hold the tool in the ground, the tool is normally unable to return to its central position behind the tractor and is held in its laterally diverted position.

In order to overcome this difficulty, applicants have provided a pair of telescoping links 61 and 62. Each of these links comprises a sleeve 63 and a shaft 64 slidable within the sleeve. Shaft 64 is likewise provided with a collar 65 keyed thereto against which the sleeve 63 is permitted to abut. The upper ends of sleeve 63 are pivotally connected respectively to the arms 31 and 32, and the lower ends of shafts 64 are pivotally secured to a bracket 66 affixed to tool bar 26 by a U-bolt 67.

It will be noted in Figure 3 that the implement of the present invention is centered with respect to the tractor and is in earth-working position. It will also be noted that the pin 42 of connecting rod 39 is about midway in the slot 41, while spring 47 is pressing against sleeve 40 to urge arms 31 and 32 downwardly and hold the working tool in the ground. In Figure 3, pin 52 is about midway in the slot 51, the downward pressure against the tool being transmitted from connecting rod 39 and spring 47 through downwardly converging links 61 and 62. In this position, sleeve 63 abuts the collar 65 to render these links rigid. Links 61 and 62 thus function as pressure rods transmitting pressure from spring 47 to keep the tool centered.

When side thrust is exerted against the implement to cause it to swing laterally, the lifting linkage described assumes the position indicated in Figure 4 when the implement is moved to the right. The constant pressure of connecting rod 39 and spring 47 through rock shaft 29 and sleeve 30 causes arms 31 and 32 to lower as the implement moves laterally. This latter movement causes links 48 to lengthen and pin 52 to assume a position near the top of the slot 51. Simultaneously link 53 telescopes to permit the lateral swinging of the links 48. As the implement moves sidewise to the right, telescoping link 62 is extended so that the sleeve 63 is withdrawn from contact with collar 65. At the same time link 61, which is closed, is forced upwardly against the action of spring 47 on connecting rod 39, since the point of pivot of the shaft 64 upon bracket 66 moves transversely and not downwardly. Force is then transmitted through rod 39 and spring 47 diagonally downwardly through link 61 against the center of the tool to force it back to its normal operating position with respect to the tractor.

Thus it should be clear that the links 61 and 62, converging downwardly and connected to the tool beam 26 near its center, resist the lateral swinging of the tool, urge the tool into the ground, and serve to keep the implement centered with respect to the tractor. When the implement is in the normal operating position shown in Figure 3, the links 61 and 62 are exerting pressure not only downwardly to hold the tool in the ground but also laterally against opposite sides of the tool to resist the lateral swinging movement thereof permitted by the manner of its connection to the tractor.

In the modification shown in Figures 5, 6, and 7 wherein parts of the tractor and implement structure are eliminated for clarity, there is shown a yoke member 68 having its arms connected to the ends of rock arms 31 and 32. Yoke 68 has a bight portion 69 to which has been pivotally connected the lower end of a bolt 70, the upper end of which has anchored thereto the lower end of a spring 71, the opposite end of which is connected to an eye bolt 72 which is threaded and passes through an opening in a bracket 73 secured to the tool bar 26 adjacent the center thereof. The manner of mounting bolt 72 in bracket 73 is illustrated in some detail in Figure 7. Bracket 73 is provided with a thickened portion 74 having an enlarged opening 75 for the reception of bolt 72, and a swivel member 76 secures bolt 70 and provides for lateral tilting thereof. Thus, while yoke member 68, which functions as the lifting linkage for connecting the implement to the tractor power lift, is rigidly held against lateral swinging movement, the working tool is permitted by virtue of the pivoting of bolt 72 to move laterally to opposite sides of a normal neutral working position, such as indicated in Figure 5, and such lateral movement is resisted by the spring 71. This lateral movement exerts a force upwardly on the yoke 68, which is countered by the pressure of spring 47 on connecting rod 39 forcing the yoke downwardly and putting tension upon spring 71 to urge the tool to return to its centered position. Upon raising the implement to transport position, the spring 71 is compressed and yoke 68 engages the bracket 73.

Having now described the invention, it should be understood that variations may be made therein without departing from the spirit of the invention or the scope of the appended claims.

What is claimed is:

1. In an agricultural machine, a traveling support, an earth-working tool, linkage connecting the tool to the support for swinging movement of the tool laterally of a normal neutral working position, resilient means connecting the tool with the support and biasing the tool downwardly to working position, and means operatively connected between said biasing means and the tool for resisting the lateral swinging of the tool.

2. In an agricultural machine, a traveling support, an earth-working tool, linkage connecting the tool to the support for swinging movement of the tool laterally of a normal neutral working position, resilient means connecting the tool with the support and biasing the tool downwardly to working position, and means associated with said linkage and deriving energy from said biasing means for resisting the lateral swinging of the tool.

3. In an agricultural machine, a traveling support, an earth-working tool, linkage connecting the tool to the support for swinging movement of the tool laterally of a normal neutral working position, and resilient means biasing the tool downwardly to working position, said resilient means serving also to resist the lateral swinging of the tool.

4. In an agricultural machine, a traveling support, an earth-working tool, linkage connecting the tool to the support for swinging movement of the tool laterally of a normal neutral working position, resilient means connecting the tool with the support and biasing the tool downwardly to working position, and means for resisting the lateral swinging of the tool including pressure elements acting upon opposite sides of said tool and reacting against said biasing means.

5. In an agricultural machine, a traveling support, an earth-working tool, linkage connecting the tool to the support for swinging movement of the tool to opposite sides of a normal neutral working position, and means exerting force in opposite directions laterally inwardly against said tool for resisting the lateral swinging thereof including normally closed telescoping pressure rods, each of said pressure rods being releasable upon movement of the tool in the direction of the other of said rods.

6. In an agricultural machine, a traveling support, an earth-working tool, linkage connecting the tool to the support for swinging movement of the tool laterally of a normal neutral working position, means for resisting the lateral swinging of the tool including telescoping rods connected between said support and said tool capable of exerting pressure in their closed position laterally inwardly against said tool in opposite directions, and resilient means connecting the tool with the support and biasing said rods to closed position.

7. In an agricultural machine, a tractor, an earth-working tool, hitch means connecting the tool to the tractor for vertical movement and for lateral swinging movement to opposite sides of a normal neutral working position, power lift means on the tractor including linkage connecting said lift means to said tool for effecting vertical movement thereof to and from earth-working position, and resilient means connecting the tool with said lift means and biasing said tool downwardly including pressure elements exerting pressure laterally inwardly and downwardly from opposite sides of said tool.

8. In an agricultural machine, a tractor, an earth-working tool, hitch means connecting the tool to the tractor for vertical movement and for lateral swinging movement to opposite sides of a normal neutral working position, power lift means on the tractor including linkage connecting said lift means to said tool for effecting vertical movement thereof to and from earth-working position, resilient means connecting the tool with said lift means and biasing said tool downwardly, and diagonally inwardly and downwardly extending pressure elements connected between said linkage and said tool and acting in opposite directions to resist lateral swinging of said tool.

9. In an agricultural machine, a traveling support, an earth-working tool, hitch means connecting the tool to the support for vertical movement and for lateral swinging movement to opposite sides of a normal neutral working position, power lift means on the support including linkage connecting said lift means to said tool for effecting vertical movement thereof to and from earth-working position, resilient means connecting said linkage and said tool to permit lateral swinging movement of the tool with respect thereto, and resilient means connecting said linkage with said lift means and urging said linkage downwardly to yieldingly hold said tool against upward movement.

10. In an agricultural machine, a traveling support, an earth-working tool, hitch means connecting the tool to the support for vertical movement and for lateral swinging movement to opposite sides of a normal neutral working position, power lift means on the support including linkage connecting said lift means to said tool for effecting vertical movement thereof to and from earth-working position, said linkage being substantially rigid against lateral swinging movement, means connecting said linkage with said lift means and urging said linkage downwardly to hold the tool in the ground, and spring means connecting said linkage and said tool for limited lateral swinging movement of the tool with respect to the linkage.

11. In an agricultural machine, a traveling support, an earth-working tool, hitch means connecting the tool to the support for vertical movement and for lateral swinging movement to opposite sides of a normal neutral working position, power lift means on the support including generally parallel links connecting said lift means to said tool for effecting vertical movement thereof to and from earth-working position, said links being pivoted for lateral swinging movement with the tool, resilient means connecting said lift means with said links and urging said tool downwardly to hold it in the ground, and means connecting said tool with said links and reacting through said resilient means for resisting the lateral swinging of said links and said tool.

12. In an agricultural machine, a traveling support, an earth-working tool, hitch means connecting the tool to the support for vertical movement and for lateral swinging movement to opposite sides of a normal neutral working position, power lift means on the support, means connecting said lift means and said tool for effecting vertical movement thereof to and from working position, including linkage permitting vertical floating movement of the tool, and resilient means holding said tool against vertical and lateral swinging movement including downwardly converging pressure elements connected between said lift means and said tool.

13. In an agricultural machine, a traveling support, an earth-working tool, hitch means connecting the tool to the support for vertical movement and for lateral swinging movement to opposite sides of a normal neutral working position, power lift means on the support, means connecting said lift means and said tool for effecting vertical movement thereof to and from working position, including linkage permitting vertical floating movement of the tool, and resilient means holding said tool against vertical and lateral swinging movement including pivoted spring means serving as the connecting means between said linkage and said tool.

14. In an agricultural machine, a tractor having a hitch point, an implement having hitch means connected adjacent its front end to the tractor for lateral swinging movement to opposite sides of a normal neutral working position and extending longitudinally of the tractor, an earth-working tool connected to said hitch means adjacent the rear end thereof for movement therewith, a transverse rock shaft on the tractor, power means on the tractor for rocking said rock shaft, generally parallel links connecting said rock shaft and said implement at a location removed from said hitch point, resilient means between said power means and said rock shaft resisting upward movement of said tool in working position, and means associated with said links for resisting lateral swinging movement of said tool.

15. In an agricultural machine, a tractor having a hitch point, an implement having hitch means connected adjacent its front end to the tractor for lateral swinging movement to opposite sides of a normal neutral working position and extending longitudinally of the tractor, an earth-working tool connected to said hitch means adjacent the rear end thereof for movement therewith, a transverse rock shaft on the tractor, linkage connecting said rock shaft and said implement at a location removed from said hitch point, power means on the tractor for vertically moving said tool to and from working position, connecting means between said power means and said rock shaft including resilient means arranged to resist upward movement of said tool in working position, and means associated with said linkage and deriving energy from said resilient means for resisting lateral swinging movement of said tool.

16. In an agricultural machine, a tractor having a hitch point, an implement having hitch means connected adjacent its front end to the tractor for lateral swinging movement to opposite sides of a normal neutral working position and extending longitudinally of the tractor, an earth-working tool connected to said hitch means adjacent the rear end thereof for movement therewith, a transverse rock shaft on the tractor, generally parallel links connecting said rock shaft and said implement at a location removed from said hitch point, power means on the tractor for vertically moving said tool to and from working position, connecting means between said power means and said rock shaft including resilient means arranged to press said tool downwardly when in working position, and means for converting a part of said downward pressure into transverse pressure directed against said implement from opposite sides thereof, comprising downwardly converging pressure elements connecting said rock shaft and said implement.

17. In an agricultural machine, a traveling support having a hitch point, an implement having hitch means connected adjacent its front end to the support for lateral swinging movement to opposite sides of a normal neutral working position and extending longitudinally of the support, an earth-working tool connected to said hitch means adjacent the rear end thereof for movement therewith, a transverse rock shaft on the support, linkage connecting said rock shaft and said implement at a location removed from said hitch point, power means on the support for vertically moving said tool to and from working position, connecting means between said power means and said rock shaft including resilient means arranged to resist upward movement of said tool in working position, and a spring serving as the connecting means between said linkage and said implement for resisting lateral swinging movement thereof.

18. In an agricultural machine, a traveling support having a hitch point, an implement having hitch means connected adjacent its front end to the support for lateral swinging movement to opposite sides of a normal neutral working position and extending longitudinally of the support, an earth-working tool connected to said hitch means adjacent the rear end thereof for movement therewith, a transverse rock shaft on the support, power means on the support for rocking said rock shaft, linkage connecting said rock shaft and said implement at a location removed from said hitch point, said linkage being secured against lateral swinging movement, a spring between said power means and said rock shaft for biasing said tool downwardly in working position, and a spring serving as the connecting means between said linkage and said tool to permit limited lateral swinging movement of the tool.

19. In an agricultural machine, a traveling support having a hitch point, an implement having hitch means connected adjacent its front end to the support for lateral swinging movement to opposite sides of a normal neutral working position and extending longitudinally of the support, an earth-working tool connected to said hitch means adjacent the rear end thereof for movement therewith, a transverse rock shaft on the support, power means on the support for rocking said rock shaft, linkage having limited telescoping movement pivotally connecting said rock shaft and said tool for lateral swinging movement thereof and of the tool, resilient means between said power means and said rock shaft for biasing said tool downwardly in working position, and means associated with said linkage and reacting through said resilient means for resisting with increasing force the lateral swinging of said links and of said tool.

20. In an agricultural machine, a traveling support having a hitch point, an implement having hitch means connected adjacent its front end to the support for lateral swinging movement to opposite sides of a normal neutral working position and extending longitudinally of the support, an earth-working tool connected to said hitch means adjacent the rear end thereof for movement therewith, a transverse rock shaft on the support, laterally spaced arms on said shaft, laterally spaced telescoping links connecting said arms and said tool, power means on the support for vertically moving said tool to and from working position, connecting means between said power means and said rock shaft including resilient means arranged to resist upward movement of said tool in working position, and downwardly converging telescoping links connecting said arms and said implement to hold said tool in the ground and resist lateral swinging movement thereof.

21. In an agricultural machine, a traveling support, an earth-working tool, hitch means connecting the tool to the support for vertical movement and for lateral swinging movement to opposite sides of a normal neutral working position, and laterally spaced downwardly converging telescoping links connecting the tool and the support.

JOHN R. ORELIND.
ARTHUR G. EVANS.

REFERENCES CITED

The following references are of record in the file of this patent:

UNITED STATES PATENTS

| Number | Name | Date |
| --- | --- | --- |
| 1,846,489 | Johnson | Feb. 23, 1932 |
| 1,348,995 | Himes | Aug. 10, 1940 |
| 1,378,196 | Plettner | May 17, 1921 |
| 1,952,486 | Beall | Mar. 27, 1934 |
| 2,217,887 | Benjamin | Oct. 15, 1940 |
| 1,456,668 | Billings | May 29, 1923 |
| 2,230,766 | Smith | Feb. 4, 1941 |